Nov. 18, 1958      A. A. WILDER      2,860,671
CHAIN SAW ATTACHMENT FOR PORTABLE CIRCULAR SAWS
Filed Dec. 24, 1956
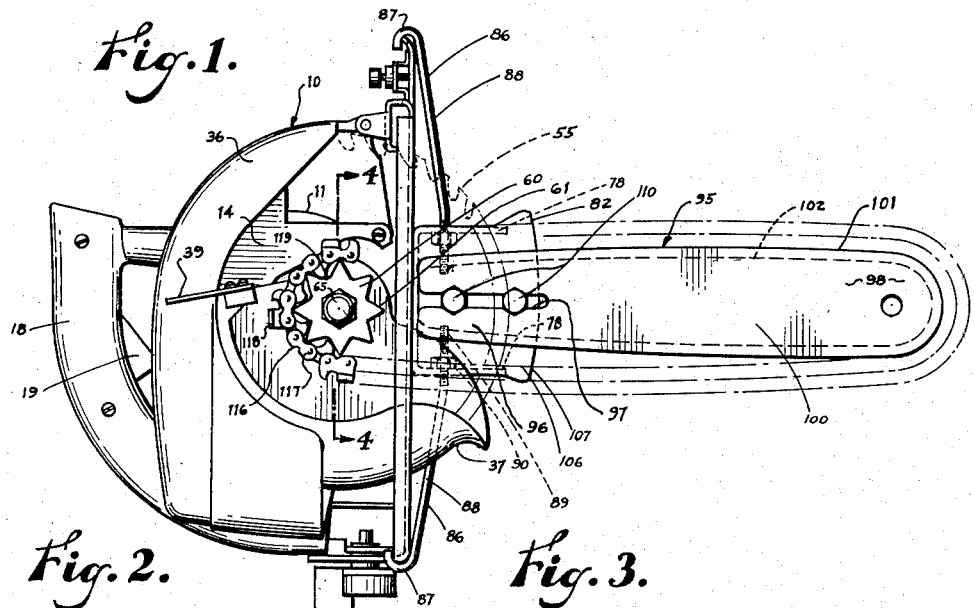
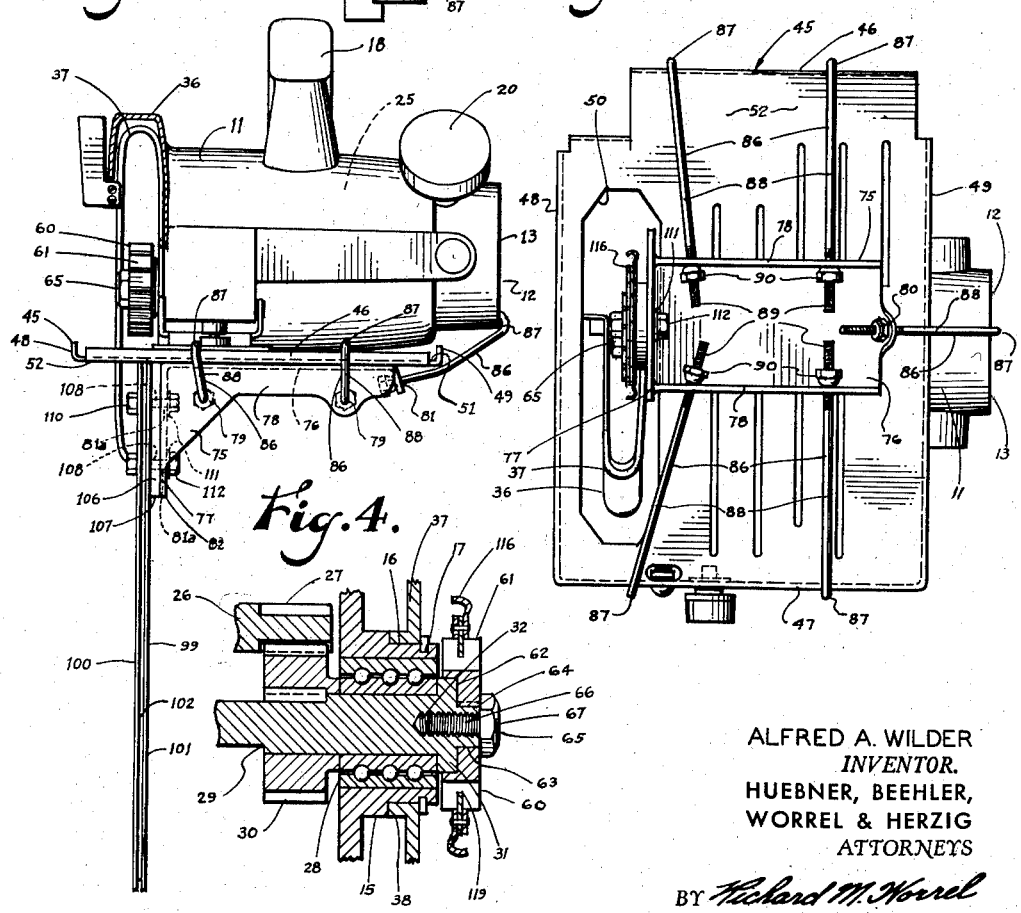
ALFRED A. WILDER
INVENTOR.
HUEBNER, BEEHLER,
WORREL & HERZIG
ATTORNEYS

United States Patent Office 2,860,671
Patented Nov. 18, 1958

2,860,671

CHAIN SAW ATTACHMENT FOR PORTABLE CIRCULAR SAWS

Alfred A. Wilder, Fresno, Calif., assignor to Edward C. Mosesian, Newton J. Caffejian, and Charles J. Vagim, doing business as Cenatron Industries, Fresno, Calif., a co-partnership Application December 24, 1956, Serial No. 630,394

7 Claims. (Cl. 143—32)

The present invention relates to portable, power driven hand saws and more particularly to an attachment for converting circular saws to chain saws.

Portable, hand operated, electrically motivated circular saws are well-known and ordinarily include a housing enclosing a small electrical motor. A drive shaft is journaled in the housing and has connection to the motor for enabling motivation of the shaft. The housing also generally includes a substantially semicircular guard concentric to the drive shaft. A circular saw having peripheral teeth is fitted on the shaft for rotation within the guard. Certain types of circular saws also provide a substantially rectangular support shoe or plate secured to the housing in substantially parallel spaced relation to the drive shaft including an elongated rectangular window through which the circular saw is received to accommodate rotation thereof.

Portable, electric, hand manipulated chain saws are also well-known. These generally consist of a housing such as that described in connection with the circular saw, a motor and drive shaft. The distinguishing characteristic of a chain saw is an elongated cutter bar around which travels an endless chain saw blade. The chain saw blade is also trained around a sprocket on the drive shaft and is motivated incident to rotation of the drive shaft.

Both chain saws and circular saws have distinct advantages with different operations. It has thus been desirable in the past to have both types of these saws available for use. In this connection, it has long been desirable to provide structures adaptable for use either as a circular saw or a chain saw. The additional expense and inconvenience of utilizing entirely distinct sawing units, instead of one unit easily converted for either operation, are immediately evident.

Accordingly, an object of the present invention is to provide an auxiliary attachment for releasably mounting a chain saw blade on a circular saw in place of the circular saw blade.

Another object is to provide an apparatus for sawing purposes which is readily converted for use as a circular saw or a chain saw.

Another object is to provide an attachment for mounting a chain saw on a circular saw in a minimum of time and with a minimum of effort.

Another object is to eliminate the expense and inconvenience involved in utilizing a separate chain saw as well as a separate circular saw for operations requiring the use of both types of saws.

Another object is to provide an attachment for releasably mounting a chain saw blade on a circular saw which permits adjustments of the chain saw blade.

Other objects are to provide an attachment of the nature described which is simple and economical to make, install, and remove; which is adaptable to many kinds of portable, power driven, hand operated saws; which is durable in construction, dependable in operation; and which is highly effective for accomplishing its intended purposes.

These with other objects will become more fully apparent upon reference to the following description and accompanying drawing.

In the drawing:

Fig. 1 is a side elevation of a circular saw showing the circular saw blade in dashed lines and incorporating the attachment of the present invention enabling conversion of the circular saw for use as a chain saw.

Fig. 2 is a top plan view of the saw of Fig. 1.

Fig. 3 is an outer face view of a support shoe of the saw of Fig. 1 and the attachment of the present invention.

Fig. 4 is a fragmentary section taken on line 4—4 of Fig. 1.

Referring more particularly to the drawing, a circular saw 10 is illustrated in Fig. 1 and is of the well-known portable, electrical, hand operated type. The saw provides an elongated generally cylindrical housing 11 having an open vent end 12 circumscribed by an edge 13 and an opposite mounting end 14. With particular reference to Fig. 4, it will be noted that the mounting end provides an outwardly extended boss 15 having a reduced annular portion 16, an annular groove 17, and a terminal annular flange. A handle 18 is secured to the housing, and a trigger 19 mounted in the handle is adapted to operate a motor switch, not shown, but well-known in the art. A knob 20 extends outwardly from the housing for steadying the saw during use.

A small electrical motor, generally indicated by the numeral 25, is mounted within the housing 11 and constitutes a prime mover for the saw 10. The motor has an output shaft 26, shown in Fig. 4, providing a pinion gear 27 integrally formed thereon. A bearing member 28 is fitted in a bore provided in the boss 15, and a drive shaft 29 is rotatably journaled in the bearing and extended both inwardly and outwardly of the housing. A spur gear 30 is secured to the inwardly extended end of the drive shaft and is in mesh with the pinion gear. The drive shaft has an enlarged mounting portion 31 outwardly of the housing and also provides an axially extended bore 32 opening endwardly of the shaft.

A generally semi-cylindrical, stationary guard 36 is secured to the mounting end 14 of the housing 11 in substantially concentric relation to the drive shaft 29. A movable guard 37 generally in the shape of a quarter of a circle is fitted within the stationary guard and provides a hub 38 rotatably journaled on the bearing portion 16 for movement within the stationary guard. A finger tab 39 is attached to the movable guard for convenience in rotation thereof.

A substantially rectangular, flat, support shoe 45 is secured to the housing 11 in spaced, substantially parallel relation to the drive shaft 29. The support shoe provides longitudinal side edges 46 and 47 and transverse side edges 48 and 49. The shoe also provides an elongated, transversely extended window 50 adjacent to the edge 48 in generally opposed relation to the outwardly extended end of the drive shaft 29, as best seen in Figs. 2 and 3. For descriptive convenience the support shoe also has an inner surface 51 adjacent to the housing and an opposite outer surface 52.

At this point it is to be noted that when the device is used as a circular saw, a circular saw blade, indicated in dashed lines at 55 in Fig. 1, is mounted on the outwardly extended end of the drive shaft 29 in peripherally spaced relation to the stationary and movable guards 36 and 37 and extended through the window 50. Inasmuch as the subject invention deals with the conversion of the circular saw to a chain saw, more detailed consideration of the circular saw blade is believed unnecessary. It is to be understood, that the blade 55 is removed prior to employing the attachment of the present invention.

Accordingly, a sprocket or wheel 60 having radially extended projections 61 provides an annular recess 62, shown in Fig. 4, and a central bore 63, respectively fitted over the enlarged mounting portion 31 of the drive shaft 29 and the terminal portion of the drive shaft outwardly of said enlarged portion. The terminal portion of the drive shaft has a flattened surface, and a key 64 in the bore of the sprocket is fitted against the flat surface for locking the sprocket against rotation relative to the drive shaft. Further, a bolt 65 provides a shank 66 screw-threadably received by the threaded bore 32, and a head 67 fitted against the sprocket.

An angular bracket 75 provides an attachment plate 76 positioned against the outer surface 52 of the support shoe 45 and a mounting plate 77 substantially right-angularly extended from the attachment plate in radial extension from the drive shaft 29. The attachment plate has a pair of opposed longitudinal side flanges 78 providing apertures 79, and a transverse end flange 80 providing an aperture 81. The mounting plate has a pair of openings 81a lying along a line generally radially extended relative to the drive shaft, and an outwardly convexed outer edge 82 substantially concentric to the drive shaft.

A plurality of elongated hooks 86 provide curved necks 87 fitted over the longitudinal side edges 46 and 47 of the support shoe 45 and the circumscribing edge 13 of the housing 11. The hooks have elongated shanks 88 providing threaded ends 89 slidably extended through the apertures 79 of the side flanges 78 and the aperture 81 of the end flange 80, all in the attachment plate 76 of the bracket 75. Nuts 90 are screw-threaded on the ends of the hooks and tightened downwardly against their respectively adjacent flanges tightly to secure the bracket 75 on the support shoe in the described position.

An elongated, generally rectangular cutter bar 95 of well-known construction provides a rear end portion 96 having a longitudinally disposed rearwardly opening slot 97, a forward end portion 98, an inner surface 99, an outer surface 100, and a peripheral edge 101 having a continuous groove 102 therein.

The cutter bar 95 is positioned in spaced, substantially parallel relation to the mounting plate 77 of the bracket 75, in radially extended relation to the drive shaft 29, and in substantially the same plane as the sprocket 60. A spacer block 106 is interposed the mounting plate and the cutter bar for spacing the cutter bar in the described planar relationship with the sprocket. The spacer block has an outwardly convexed outer edge 107 substantially coincident with the outer edge 82 of the bracket 75 and a pair of holes 108 in registration with the openings 81a in the mounting plate 77.

Bolts 110 are extended through the slot 97 in the cutter bar 95, through the holes 108 of the spacer block 106, and through the openings 81a of the mounting plate 77. Washers 111 are fitted over these bolts against the mounting plate, and nuts 112 are screw-threaded on the bolts and tightened against the washers. Thus the cutter bar is adjustably mounted in the described position.

An elongated, endless chain saw blade 116 of well-known form includes a plurality of links 117 mounting teeth 118 outwardly extended therefrom and guides 119 inwardly extended therefrom and adapted to be received for slidable movement in the groove 102 of the cutter bar 95 and around the sprocket 60. It will be evident that the chain saw blade may be tightened or loosened by sliding the cutter bar radially outwardly or inwardly, respectively, on the bolts 110 incident to loosening of the nuts 112.

*Operation*

The operation of the described embodiment of the subject invention is believed to be readily apparent and is briefly summarized at this point.

As previously stated, the present invention enables the convenient and rapid conversion of a circular saw to a chain saw. It is thus assumed that initially the circular saw blade 55 is secured to the drive shaft 29. In order to make the conversion, the blade is removed. The sprocket 60 and the bracket 75 are then secured to the drive shaft and support shoe 45, respectively, as above described. Next, the cutter bar 95 and chain saw blade 116 are mounted on the bracket and sprocket. By squeezing the trigger 19, the motor 25 is energized to rotate the drive shaft. This moves the chain saw blade around the cutter bar and the saw is ready for use.

The chain saw may be just as easily reconverted into a circular saw, as will be evident.

From the foregoing it will be understood that an attachment has been provided for enabling the use of both a chain saw and a circular saw on a single basic unit. The conversion from one to the other can be accomplished in a minimum of time and with a minimum of effort. The subject invention eliminates the expense and inconvenience involved in utilizing an entirely separate chain saw and an entirely separate circular saw for operations in which the use of both saws may be required.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In connection with a portable circular saw drive means including a housing, a prime mover in the housing, a drive shaft rotatably driven by the prime mover and extended out of the housing for removably receiving a circular saw blade, a substantially rectangular support shoe connected to the housing in a plane substantially parallel to the drive shaft, and a handle connected to the housing adapted to direct the drive means when employing a circular saw blade along a line of travel transversely of the drive shaft longitudinally of the shoe; an auxiliary attachment for converting the circular saw to a chain saw comprising a bracket having an attachment plate releasably connected to the support shoe and a mounting plate angularly extended from the attachment plate in a plane substantially normal to the drive shaft and substantially parallel to said line of travel, a sprocket releasably fitted on the drive shaft, an elongated cutter bar releasably mounted on the mounting plate in a substantially common plane with the sprocket and radially extended outwardly relative to the drive shaft in the same direction as the spacing of the mounting plate therefrom substantially parallel to said line of travel, and a chain saw blade extended around the cutter bar and the sprocket for travel in a circuitous path upon rotation of the drive shaft.

2. In connection with a portable circular saw drive means including a housing, a prime mover in the housing, a drive shaft rotatably driven by the prime mover and extended out of the housing for removably receiving a circular saw blade, and a substantially rectangular flat support shoe having peripheral edges and being connected to the housing in substantially parallel spaced relation to the drive shaft, an auxiliary attachment for converting the circular saw to a chain saw comprising an angular bracket including an attachment plate positioned against the support shoe and a mounting plate substantially right-angularly extended from the attachment plate and in radial extension from the drive shaft, elongated hooks having curved necks fitted over the peripheral edges of the support shoe and opposite ends releasably adjustably connected to the attachment plate, a sprocket releasably keyed on the drive shaft, an elongated cutter bar radially extended relative to the drive shaft in substantially the same plane as the sprocket and in substantially parallel spaced relation to the mounting plate, a spacer block interposed the mounting plate and the cutter bar, means releasably connecting the cutter bar and spacer block to the mounting plate, and an endless chain saw blade extended around the cutter bar and the sprocket for travel in a circuitous path incident to rotation of the drive shaft.

3. In a connection with a portable circular saw drive means including a housing, a prime mover in the housing, a drive shaft rotatably driven by the prime mover and extended out of the housing for removably receiving a circular saw blade, and a substantially rectangular flat support shoe having peripheral edges and being connected to the housing in substantially parallel spaced relation to the drive shaft, an auxiliary attachment for converting the circular saw to a chain saw comprising an angular bracket including an attachment plate positioned against the support shoe having outwardly extended spaced flanges providing apertures therein, the bracket further including a mounting plate substantially right-angularly extended from the attachment plate and in radial extension from the drive shaft, the mounting plate having a pair of openings therein, hooks having curved necks fitted over the peripheral edges of the support shoe and elongated threaded shanks extended through the apertures of the attachment plate, nuts screw-threadably turned on the shanks for releasably securing the bracket to the shoe, a sprocket releasably keyed on the drive shaft, an elongated cutter bar radially extended relative to the drive shaft in substantially the same plane as the sprocket and in substantially parallel spaced relation to the mounting plate, a spacer block interposed the mounting plate and the cutter bar, bolts extended through the cutter bar, spacer block, and openings of the mounting plate, nuts screw-threadably turned on the bolts for releasably securing the cutter bar and spacer block to the mounting plate, and an endless chain saw blade extended around the cutter bar and the sprocket for travel in a circuitous path incident to rotation of the drive shaft.

4. In connection with a portable circular saw drive means including a housing, a prime mover in the housing, a drive shaft rotatably driven by the prime mover and extended out of the housing for removably receiving a circular saw blade thereon, a support shoe connected to the housing in a plane substantially parallel to the drive shaft for slidably supporting the drive means on a workpiece when a circular saw blade is employed, and a handle disposed in a plane substantially normal to the drive shaft for manual movement of the drive means along a line of travel substantially right-angularly related to the drive shaft; an auxiliary attachment for converting the circular saw to a chain saw comprising an angular bracket including an attachment plate and a mounting plate substantially right-angularly extended from the attachment plate; means releasably rigidly mounting the bracket on the shoe with the attachment plate in facing engagement with the shoe and the mounting plate disposed in a plane substantially normal to the drive shaft and parallel to the plane of the handle; a sprocket releasably mounted on the drive shaft; an elongated cutter bar radially extended relative to the drive shaft in parallel spaced relation to the mounting plate; means releasably mounting the cutter bar on the mounting plate in a plane substantially normal to the drive shaft, parallel to the handle, and intersecting the sprocket; and an endless chain saw blade extended around the cutter bar and the sprocket for travel in a circuitous path incident to rotation of the drive shaft.

5. In connection with a manually manipulable, portable, circular saw drive means including a housing, a prime mover in the housing, a drive shaft rotatably driven by the prime mover and extended out of the housing for removably receiving a circular saw blade thereon, a support shoe connected to the housing in a plane substantially parallel to the drive shaft for slidably supporting the drive means on a workpiece when a circular saw blade is employed, and a handle adapted to direct the drive means during sawing operations in a predetermined plane normal to the drive shaft, an auxiliary attachment for converting the circular saw to a chain saw comprising an angular bracket including an attachment plate positioned against the support shoe and a mounting plate substantially right-angularly extended from the attachment plate in a plane substantially normal to the shaft; means releasably rigidly mounting the bracket on the shoe, a sprocket releasably mounted on the drive shaft; an elongated cutter bar radially extended relative to the drive shaft in parallel relation to the mounting plate; means releasably mounting the cutter bar on the mounting plate in a plane substantially normal to the drive shaft, parallel to said predetermined plane of direction, and intersecting the sprocket; and an endless chain saw blade extended around the cutter bar and the sprocket for travel in a circuitous path incident to rotation of the drive shaft.

6. In connection with a portable circular saw drive means including a housing, a prime mover in the housing, a drive shaft rotatably driven by the prime mover and extended out of the housing for removably receiving a circular saw blade, and a substantially rectangular flat support shoe having peripheral edges and being connected to the housing in substantially parallel spaced relation to the drive shaft, an auxiliary attachment for converting the circular saw to a chain saw comprising a bracket, elongated hooks having curved necks fitted over the peripheral edges of the support shoe and opposite ends releasably connected to the bracket rigidly mounting the bracket on the shoe, a sprocket releasably mounted on the drive shaft for rotation therewith, an elongated cutter bar radially extended relative to the drive shaft in substantially the same plane as the sprocket, means mounting the bar on the bracket, and an endless chain saw blade extended around the cutter bar and the sprocket for circuitous travel thereabout.

7. In connection with a portable circular saw drive means including a housing, a prime mover in the housing, a drive shaft rotatably driven by the prime mover and extended out of the housing for removably receiving a circular saw blade, and a substantially rectangular flat support shoe having peripheral edges and being connected to the housing in substantially parallel spaced relation to the drive shaft, an auxiliary attachment for converting the circular saw to a chain saw comprising an angular bracket including an attachment plate positioned against the support shoe and a mounting plate substantially right-angularly extended from the attachment plate and in radial extension from the drive shaft, elongated hooks having curved necks fitted over the peripheral edges of the support shoe and opposite ends releasably adjustably connected to the attachment plate, a sprocket releasably mounted on the drive shaft, an elongated cutter bar radially extended relative to the drive shaft in substantially the same plane as the sprocket, means mounting the cutter bar on the mounting plate, and an endless chain saw blade extended around the cutter bar and the sprocket for travel thereabout upon rotation of the drive shaft.

References Cited in the file of this patent

UNITED STATES PATENTS

| 1,540,388 | Crowe | June 2, 1925 |
| 2,348,588 | Arsneau | May 9, 1944 |
| 2,435,192 | Arsneau | Feb. 3, 1948 |

FOREIGN PATENTS

| 88,895 | Sweden | Mar. 31, 1937 |
| 118,817 | Australia | Aug. 14, 1944 |